United States Patent
Sadhu et al.

(10) Patent No.: US 9,021,222 B1
(45) Date of Patent: Apr. 28, 2015

(54) MANAGING INCREMENTAL CACHE BACKUP AND RESTORE

(75) Inventors: Vamsikrishna Sadhu, Karnataka (IN); Brian R. Gruttadauria, Sutton, MA (US)

(73) Assignee: Lenovoemc Limited, Hong Kong (HK)

( * ) Notice: Subject to any disclaimer, the term of this patent is extended or adjusted under 35 U.S.C. 154(b) by 181 days.

(21) Appl. No.: 13/432,637

(22) Filed: Mar. 28, 2012

(51) Int. Cl.
*G06F 12/16* (2006.01)
*G06F 12/08* (2006.01)
*G06F 11/14* (2006.01)

(52) U.S. Cl.
CPC ........ *G06F 11/1446* (2013.01); *G06F 12/0866* (2013.01)

(58) Field of Classification Search
CPC ..... G06F 3/065; G06F 3/067; G06F 11/1446; G06F 2201/84
USPC .................. 711/118, 162, 161, 144
See application file for complete search history.

(56) References Cited

U.S. PATENT DOCUMENTS

| | | | |
|---|---|---|---|
| 7,769,722 B1 | 8/2010 | Bergant et al. | |
| 7,818,299 B1 | 10/2010 | Federwisch et al. | |
| 7,992,038 B1 * | 8/2011 | Glade et al. | 714/11 |
| 8,127,307 B1 * | 2/2012 | Palekar et al. | 719/318 |
| 8,335,771 B1 | 12/2012 | Natanzon et al. | |
| 8,352,785 B1 * | 1/2013 | Nicklin et al. | 714/15 |
| 8,356,015 B1 * | 1/2013 | Suryanarayanan et al. | 707/687 |
| 8,615,678 B1 * | 12/2013 | Madnani et al. | 714/5.1 |
| 2008/0082770 A1 | 4/2008 | Ahal et al. | |
| 2010/0005259 A1 | 1/2010 | Prahlad et al. | |
| 2010/0077165 A1 | 3/2010 | Lu et al. | |
| 2010/0228919 A1 * | 9/2010 | Stabrawa et al. | 711/120 |
| 2011/0022566 A1 | 1/2011 | Beaverson et al. | |
| 2011/0320733 A1 * | 12/2011 | Sanford et al. | 711/135 |
| 2012/0016842 A1 | 1/2012 | Furuya | |
| 2012/0215970 A1 * | 8/2012 | Shats | 711/103 |

OTHER PUBLICATIONS

Vamsikrishna Sadhu, Brian R. Gruttadauria, Suresh Kimar Kalidindi, "Managing Cache Backup and Restore Using Continuous Data Replication and Protection" file history of related U.S. Appl. No. 13/435,295, filed Mar. 30, 2012.

* cited by examiner

*Primary Examiner* — Than Nguyen
(74) *Attorney, Agent, or Firm* — John L. Rogitz; John M. Rogitz

(57) ABSTRACT

A method is used for managing incremental cache backup and restore. I/O operations are quiesced at a cache module. A first snapshot of a storage object and a second snapshot of an SSD cache object are taken. The I/O operations at the cache module are unquiesced. A single backup image comprising the first snapshot and the second snapshot is created.

20 Claims, 9 Drawing Sheets

SSD CACHE CONFIGURED FILE SYSTEM STORAGE OBJECT

SSD CACHE CONFIGURED RAW STORAGE OBJECT

CACHE CONFIGURED STORAGE OBJECT BACKUP

CACHE CONFIGURED STORAGE OBJECT RESTORE

MANAGING INCREMENTAL CACHE BACKUP AND RESTORE

CROSS-REFERENCE TO RELATED APPLICATIONS

This application is related to U.S. patent application Ser. No. 13/342,008 entitled MANAGING CACHE BACKUP AND RESTORE, filed Dec. 31, 2011, which is incorporated herein by reference for all purposes.

BACKGROUND

1. Technical Field

This application relates to managing incremental cache backup and restore.

2. Description of Related Art

Storage devices are employed to store data that is accessed by computer systems. Examples of basic storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller.

As is known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

Advances in semiconductor technology have lead to an increase in the use of a semiconductor solid state drive (also known as a solid state disk or SSD) which uses a flash memory as a storage device, in areas such as computer systems. Thus, in at least some cases there seems to be a trend towards the use of an SSD as a storage device instead of a magnetic disk. In spite of having features such as, for example, a relatively small storage capacity and a relatively high price, the SSD has some other features that can make it more attractive as a storage device than the conventional magnetic disk in at least some cases.

Features that can make SSDs preferable as storage devices are, for example, a fast access rate, high throughput, a high integration density, and stability against an external impact. SSDs can move much larger amounts of data and process far more I/O requests, per time period, than conventional magnetic disks. This allows users to complete data transactions much more quickly.

Furthermore, advances in manufacturing technologies for SSDs may reduce the production costs of SSDs and also increase the storage capacities of SSDs. These developments may provide further incentive to use SSDs in place of magnetic disks in at least some cases.

Solid state disk systems may also comprise communication controllers, such as Fibre Channel (FC) controllers, Ethernet mechanisms, ATA or serial ATA interfaces, or SCSI controllers for managing data communication with external computing devices.

A storage device may also be accessible over a network. Examples of such a storage device include network attached storage (NAS) and storage area network (SAN) devices. A storage device may be a single stand-alone component or be comprised of a system of storage devices such as in the case of Redundant Array of Inexpensive Disks (RAID) groups.

Virtually all computer application programs rely on such storage devices which may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume ("LUN") and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping technology may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

Some storage systems receive and process access requests that identify data organized by file system. A file system is a logical construct that translates physical blocks of storage on a storage device into logical files and directories. In this way, the file system aids in organizing content stored on a disk. For example, an application program having ten logically related blocks of content to store on disk may store the content in a single file in the file system. Thus, the application program may simply track the name and/or location of the file, rather than tracking the block addresses of each of the ten blocks on disk that store the content.

File systems maintain metadata for each file that, inter alia, indicates the physical disk locations of the content logically stored in the file. For example, in UNIX file systems an inode is associated with each file and stores metadata about the file. The metadata includes information such as access permissions, time of last access of the file, time of last modification of the file, and which blocks on the physical storage devices store its content. The file system may also maintain a map, referred to as a free map in UNIX file systems, of all the blocks on the physical storage system at which the file system may store content. The file system tracks which blocks in the map are currently in use to store file content and which are available to store file content.

When an application program requests that the file system store content in a file, the file system may use the map to select available blocks and send a request to the physical storage devices to store the file content at the selected blocks. The file system may then store metadata (e.g., in an inode) that associates the filename for the file with the physical location of the content on the storage device(s). When the file system receives a subsequent request to access the file, the file system may access the metadata, use it to determine the blocks on the physical storage device at which the file's content is physically stored, request the content from the physical storage device(s), and return the content in response to the request.

In general, since file systems provide computer application programs with access to data stored on storage devices in a logical, coherent way, file systems hide the details of how data is stored on storage devices from application programs. For instance, storage devices are generally block addressable, in that data is addressed with the smallest granularity of one block; multiple, contiguous blocks form an extent. The size of the particular block, typically 512 bytes in length, depends upon the actual devices involved. Application programs generally request data from file systems byte by byte. Consequently, file systems are responsible for seamlessly mapping between application program address-space and storage device address-space.

File systems store volumes of data on storage devices, i.e., collections of data blocks, each for one complete file system instance. These storage devices may be partitions of single physical devices or logical collections of several physical devices. Computers may have access to multiple file system volumes stored on one or more storage devices.

File systems maintain several different types of files, including regular files and directory files. Application programs store and retrieve data from regular files as contiguous, randomly accessible segments of bytes. With a byte-addressable address-space, applications may read and write data at any byte offset within a file. Applications can grow files by writing data to the end of a file; the size of the file increases by the amount of data written. Conversely, applications can truncate files by reducing the file size to any particular length. Applications are solely responsible for organizing data stored within regular files, since file systems are not aware of the content of each regular file.

Files are presented to application programs through directory files that form a tree-like hierarchy of files and subdirectories containing more files. Filenames are unique to directories but not to file system volumes. Application programs identify files by pathnames comprised of the filename and the names of all encompassing directories. The complete directory structure is called the file system namespace. For each file, file systems maintain attributes such as ownership information, access privileges, access times, and modification times.

File systems often utilize the services of operating system memory caches known as buffer caches and page caches. These caches generally consist of system memory buffers stored in volatile, solid-state memory of the computer. In this context, caching is a technique to speed up data requests from application programs by saving frequently accessed data in memory for quick recall by the file system without having to physically retrieve the data from the storage devices. Caching is also useful during file writes; the file system may write data to the memory cache and return control to the application before the data is actually written to non-volatile storage. Eventually, the cached data is written to the storage devices.

The state of the cache depends upon the consistency between the cache and the storage devices. A cache is "clean" when its contents are exactly the same as the data stored on the underlying storage devices. A cache is "dirty" when its data is newer than the data stored on storage devices; a cache becomes dirty when the file system has written to the cache, but the data has not yet been written to the storage devices. A cache is "stale" when its contents are older than data stored on the storage devices; a cache becomes stale when it has not been updated to reflect changes to the data stored on the storage devices.

In order to maintain consistency between the caches and the storage devices, file systems perform "flush" and "invalidate" operations on cached data. A flush operation writes dirty cached data to the storage devices before returning control to the caller. An invalidation operation removes stale data from the cache without invoking calls to the storage devices. File systems may flush or invalidate caches for specific byte-ranges of the cached files.

Many file systems utilize data structures mentioned above called inodes to store information specific to each file. Copies of these data structures are maintained in memory and within the storage devices. Inodes contain attribute information such as file type, ownership information, access permissions, access times, modification times, and file size. Inodes also contain lists of pointers that address data blocks. These pointers may address single data blocks or address an extent of several consecutive blocks. The addressed data blocks contain either actual data stored by the application programs or lists of pointers to other data blocks. With the information specified by these pointers, the contents of a file can be read or written by application programs. When application programs write to files, data blocks may be allocated by the file system. Such allocation modifies the inodes.

Additionally, file systems maintain information, called "allocation tables", that indicate which data blocks are assigned to files and which are available for allocation to files. File systems modify these allocation tables during file allocation and de-allocation. Most modern file systems store allocation tables within the file system volume as bitmap fields. File systems set bits to signify blocks that are presently allocated to files and clear bits to signify blocks available for future allocation.

SUMMARY OF THE INVENTION

A method is used for managing incremental cache backup and restore. I/O operations are quiesced at a cache module. A first snapshot of a storage object and a second snapshot of an SSD cache object are taken. The I/O operations at the cache module are unquiesced. A single backup image comprising the first snapshot and the second snapshot is created.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

High-end data storage devices provide enhanced I/O performance through multi-spindle RAID configurations. Most general RAID configurations provide higher levels of sequential performance over single drive configurations, but the performance of highly random I/O workloads can suffer on any storage configuration built from rotating media devices.

Solid state drives have become a cost effective, power saving, performance solution for consumers and small businesses, but can trail traditional hard drives in terms of cost of capacity. Having a flash cache feature in data storage device allows users to combine a single SSD with a traditional RAID configuration and realize the performance benefits of the SSD without the added cost of moving to an entirely SSD based solution.

Figure 1:
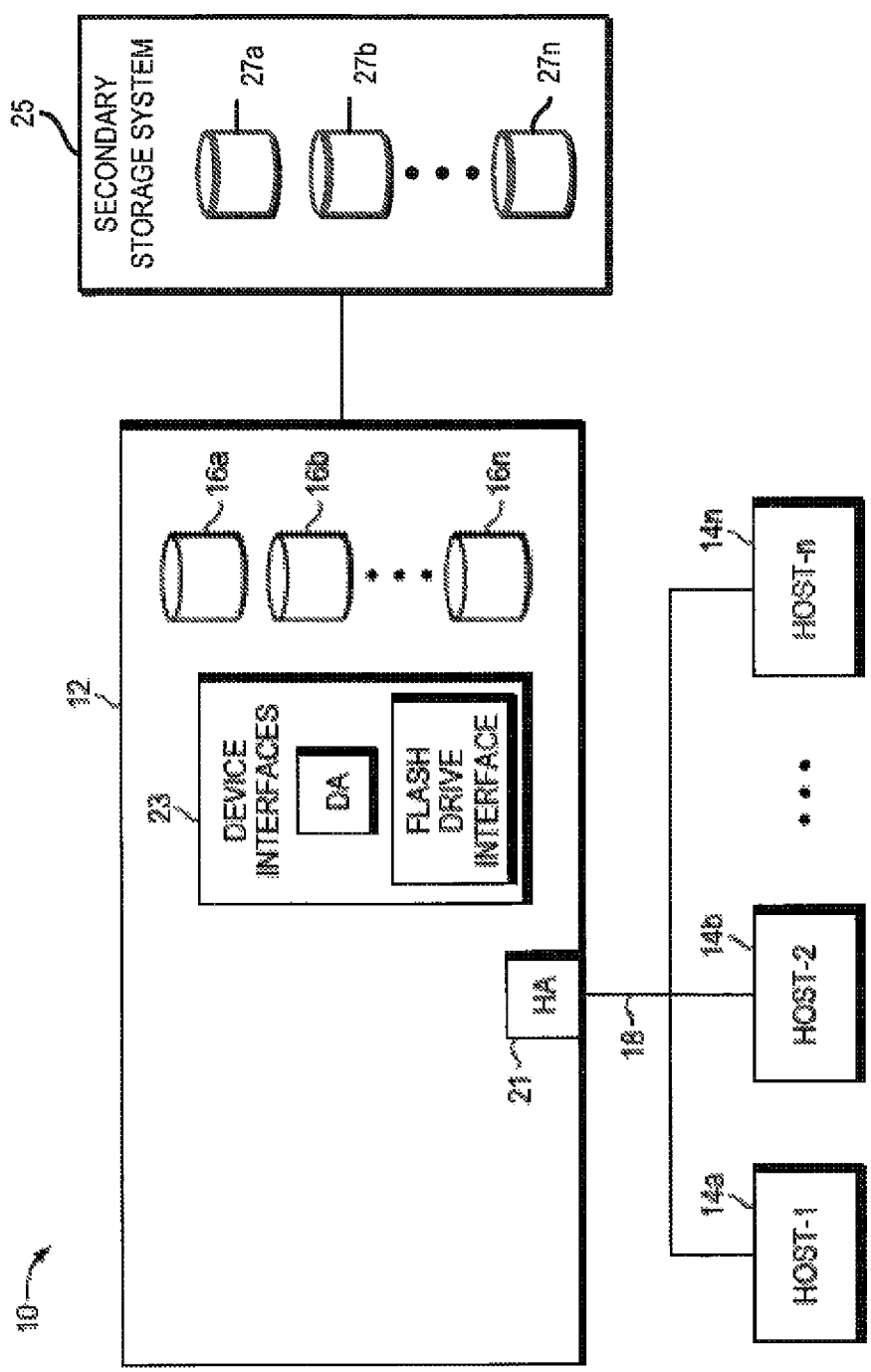
FIG. 1 is a block diagram illustrating an example embodiment that may utilize the techniques described herein.

Referring to FIG. 1, shown is an example of an embodiment of a system that may be used in connection with performing one or more implementations of the current techniques described herein. The system 10 includes a data storage system 12 connected to host systems 14a-14n and secondary storage system(s) 25 through communication medium 18. In this embodiment of the computer system 10, the n hosts 14a 14n may access the data storage system 12 and/or secondary storage system 25, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage system 12 and/or secondary storage system 25, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application. In alternative example embodiments, the secondary storage system 25 may be connected directly to the hosts 14a-14n or other hosts (not shown).

It should be noted that the particular examples of the hardware and software that may be included in the data storage systems 12, 25 are described herein in more detail, and may vary with each particular embodiment. Each of the host computers 14a-14n and data storage systems may all be located at the same physical site, or, alternatively, may also be located in different physical locations. The communication medium that may be used to provide the different types of connections between the host computer systems and the data storage systems of the system 10 may use any of a variety of different communication protocols. Some or all of the connections by which the hosts and data storage system may be connected to the communication medium may pass through other communication devices, such as switching equipment and/or a phone line, a repeater, a multiplexer or a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12 and/or the secondary storage system 25.

It should be noted that although elements 12 and 25 are illustrated as single data storage systems, such as single data storage arrays, elements 12 and 25 may also represent, for example, multiple data storage arrays alone, or in combination with, other data storage devices, systems, appliances, and/or components having suitable connectivity, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage systems 12, 25 may be a data storage array including a plurality of data storage devices 16a-16n, 27a-27n. The data storage devices 16a-16n, 27a-27n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data through channels to the storage systems, and the storage systems may also provide data to the host systems also through the channels. Data in a single data storage system, such as a single data storage array, may be accessed by multiple hosts allowing the hosts to share the data residing therein.

The data storage system 12 in the embodiment of FIG. 1 further comprises a host adaptor (HA) 21 (e.g., network interface card (NIC) or other network interface) coupled to the hosts 14a-14n via the communication medium 18 that may operate in accordance with the technique described herein. Device interfaces 23 may comprise device adaptors and interfaces (e.g., a flash drive interface). Secondary storage system 25 may be similarly configured and include similar components (not shown).

As described above, the data storage systems 12, 25 may be data storage arrays including a plurality of data storage devices 16a-16n, 27a-27n, respectively, in which one or more of the devices 16a-16n, 27a-27n are flash memory devices employing one or more different flash memory technologies. In one embodiment, the data storage system 12 and/or secondary storage array 25 may be an Iomega® StorCenter storage system by EMC Corporation of Hopkinton, Mass. In the foregoing data storage arrays, the data storage devices 16a-16n, 27a-27n may include a combination of disk devices and flash devices in which the flash devices may appear as standard drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC devices and/or MLC devices. Additionally, flash memory devices and disk devices are two exemplary types of devices that may be included in a data storage system used in connection with the techniques described herein.

Thus, the storage systems may include a variety of storage devices with different physical and performance characteristics (e.g., types of storage devices, disk speed such as in RPMs), RAID levels and configurations, different replication services (such as particular software used in the data storage system providing data replication), allocation of cache, and processors used to service an I/O request.

Figure 2:
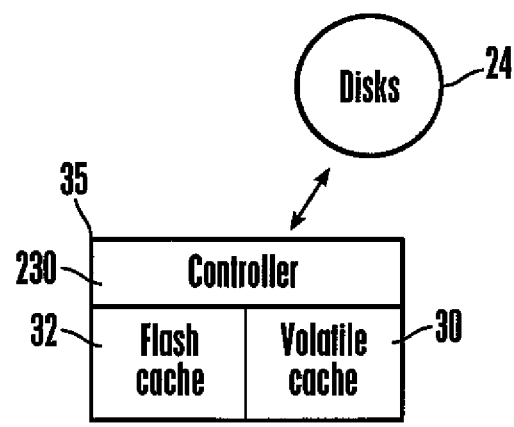
FIG. 2 is a block diagram illustrating an example embodiment in additional detail that may utilize the techniques described herein.

Referring to FIG. 2, shown is a more detailed representation of components that may be included in an embodiment using the techniques herein. In the example 20, a data storage system 12 may include disks 24 as described above. The data storage system 12 may also include storage processing circuitry 35 having a controller 230, a flash-based cache 32, and optionally a volatile memory cache 30 (e.g., DRAM) as well. As described in more detail below, one or more of the disks 24 may be, include, or be included in a flash-based disk, and cache 32 may include such flash-based disk.

The flash-based cache 32 is a flash-based memory or solid state drive (SSD) which is non-volatile to store data persistently. During normal operations, data may be stored to a portion of the component 32, and data may be read from disk into a portion of component 32.

The controller 230 may be configured to perform data storage operations (e.g., file system operations) on behalf of the hosts of FIG. 1 during normal operation using the flash based cache 32 and the disks 24. During normal operation in the case of a write request, when a host sends a request to write data to the data storage system, the controller 230 may store the data of the write request to a portion of the component 32. During normal operation in the case of a read request, when a host sends a request to read data from the data storage system, the controller 230 reads the data of the read request from component 32 if such data is available there. Also, depending on the implementation, the controller may be configured to perform, for example, as a background process, copying of data from disks 24 to a portion of the component 32 and/or from component 32 to disks 24.

As will be appreciated by those skilled in the art, the data storage 12 may also include other components than as described for purposes of illustrating the techniques herein.

Figure 3:
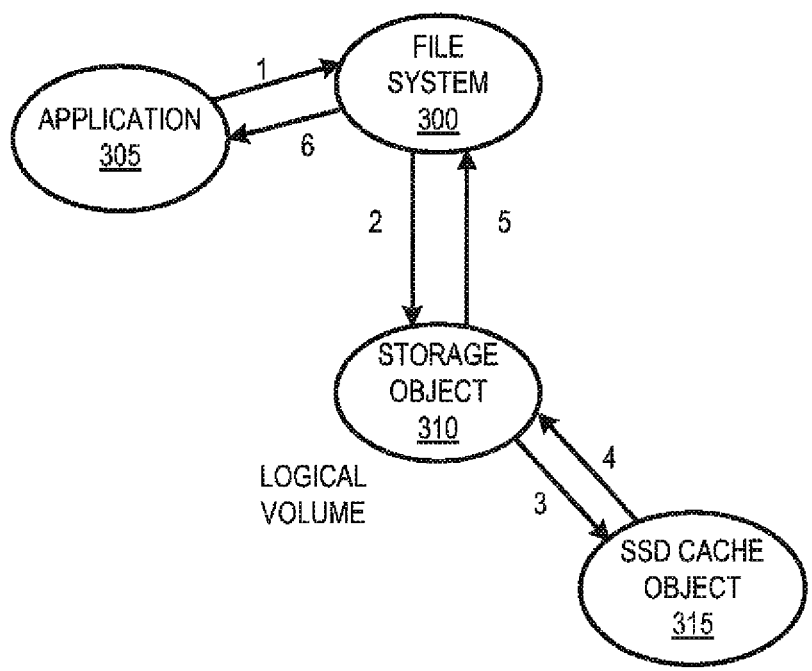
FIG. 3 is a state diagram illustrating an I/O state machine of an SSD cache configured file system storage object.

FIG. 3 depicts a state diagram illustrating I/O flow in a state machine for an SSD cache configured file system storage object. I/Os flow between a file system 300, application 305, storage object 310, and SSD cache object 315 according to the numbered steps. FIG. 3 also illustrates the layout of the file system 300 and the objects 310 and 315 with respect to each other. In this configuration, the storage object 310 is a logical volume that is created and mounted on top of the SSD cache object 315. The file system 300 is mounted on the storage object 310 and the file system 300 communicates directly with the application 305 and the storage object 310.

In step 1, I/O operations flow from the application 305 to the file system 300. In step 2, the I/O operation may flow from the file system 300 to the storage object 310. In step 3, I/O operation may flow from the storage object 310 to the SSD cache object 315. In step 4, the I/O operation flows from the SSD cache object 315 back storage object 310. In step 5, the I/O operation flows from the storage object 310 back to the file system 300. From there, in step 6, the I/O operation is transmitted from the file system 300 back to the application 305 and processed accordingly. It should be noted that although the example employs a file system 300, and therefore supports files, this should not be construed as a limitation. Other known data protocols are supported such as, for example, blocks.

Figure 4:
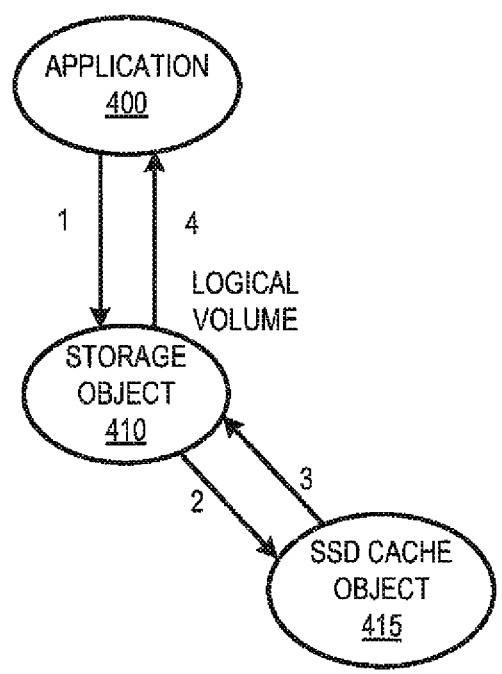
FIG. 4 is a state diagram illustrating an example embodiment of an I/O state machine of an SSD cache configured raw storage object.

FIG. 4 illustrates an example embodiment of an I/O state machine for an SSD cache configured raw storage object implemented according to techniques described herein. The storage object 410 may be represented as a logical volume that can be implemented in software executed by the storage processing circuitry 35. The SSD cache object 415 may be a logical volume built using flash based cache 32. In this configuration, the SSD cache object 415 communicates directly with the storage object 410.

I/O operations flow between the application 400 and objects 410 and 415 as shown in the numbered steps. For example, in step 1, I/O operations received from hosts 14a-n at (or generated by) an application 400 flow from the application 400 to the raw storage object 410. In step 2, I/O operations may flow from the raw storage object 410 to the SSD cache object 415. In step 3, I/O operations flow from the SSD cache object 415 back to the storage object 410 via, for example, an I/O callback. In step 4, an I/O operation (e.g., buffer) is returned to the application 400.

Figure 5:
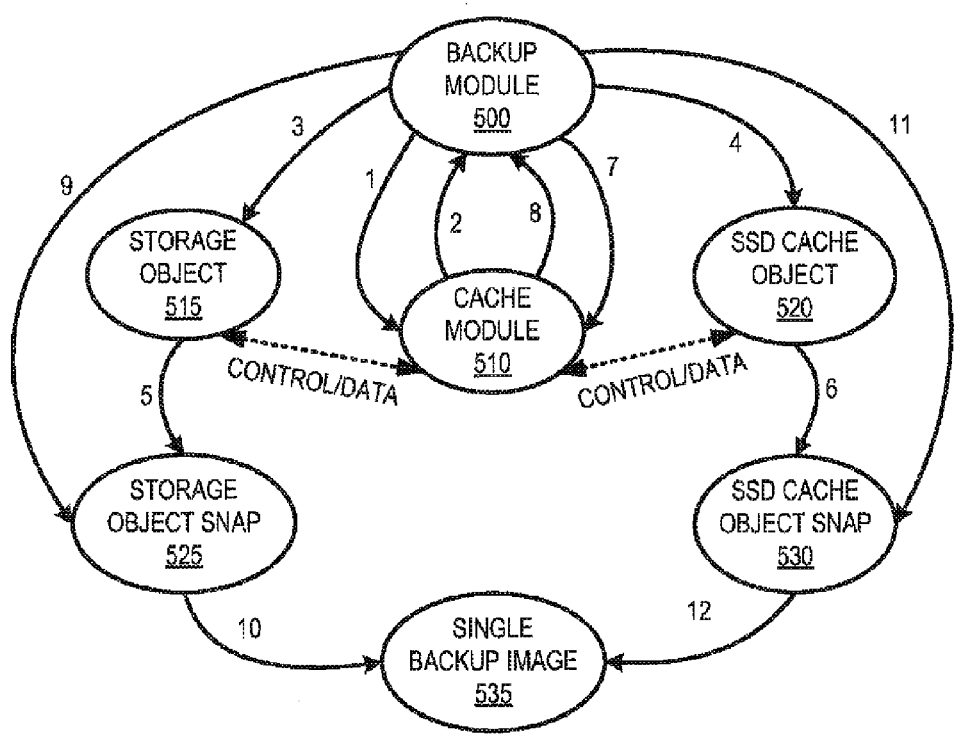
FIG. 5 is a block diagram illustrating an example embodiment of a backup module that may utilize the techniques described herein.

FIG. 5 depicts an example embodiment of a backup module that may utilize the techniques described herein. I/O flow is shown for backup of a cache configured storage object and proceeds according to the numbered steps. In this example, the backup module 500 in conjunction with the cache module 510 generate snap backups for the storage object 515 and the SSD cache object 520. The storage object 515 and SSD cache object 520 are then merged into a single backup image 535. Although snapshot technology is used to illustrate the techniques described herein, other known backup technology may be similarly utilized. Further, although the techniques describe a single backup image 535, alternative example embodiments may use multiple backup images.

The techniques described herein advantageously enable communication between the backup module 500 and the cache module 510. Accordingly, in step 1, the backup module 500 may issue a request to freeze or quiesce I/O operations (e.g., I/O communications) to the cache module 510. Freezing or quiescing I/O operations may be performed to prepare the storage system for creating a consistent backup state. For example, updates are not allowed to an object but reads are allowed. In some embodiments, quiescing may be associated with performing one or more operations to ensure object consistency. In some embodiments quiescing a storage object includes performing one or more following: flushing one or more buffers associated with the object, disabling updates to the object, and logging transactions associated with the object. In various embodiments, the type of operations associated with performing quiescing is configurable. For example, configuration parameters may be included with the request to specify the type of operations and/or configuration associated with the operations performed during quiescing. Quiescing I/O operations associated with applications running on a host may be coordinated by the host.

In step 2, a response is sent from the cache module 510 back to the backup module 500. In step 3, a snapshot request is generated and forwarded to the storage object 515. Similarly, in step 4, another snapshot request is generated and forwarded to the SSD cache object 520. In step 5, based on the received request, a snapshot image of the storage object is created. In step 6, based on the received request, a snapshot image of the SSD cache object is created. In step 7, I/O operations are resumed (i.e., unfrozen or unquiesced). In some embodiments, unquiescing a component includes performing one or more of the following: re-enabling updates, ending hot backup transaction logging, and implementing changes requested to the object while quiesced. In step 8, a response is sent from the cache module 510 to the backup module 500. In step 9, a backup request is forwarded from the backup module 500 to the storage object snap 525. In various embodiments, the type of backup method used is configurable and/or specified by configuration preference included with the request. In some embodiments, backup is initiated within a prescribed or indicated amount of time from unquiescing I/O operations.

A complete backup of the storage object snap may be forwarded to the single backup image 535 in step 10. In step 11, a backup request is forwarded from the backup module 500 to the SSD cache object snap. In step 12, a backup of SSD cache dirty block and metadata dump of clean block is performed. Thus, a single backup image of both the storage object snap 525 and the SSD cache object snap 530 may be created. The control module 510 may communicate with the storage object 515 and/or the SSD cache object 520 via control/data signals which communications are represented via the dotted communication paths.

Figure 6:
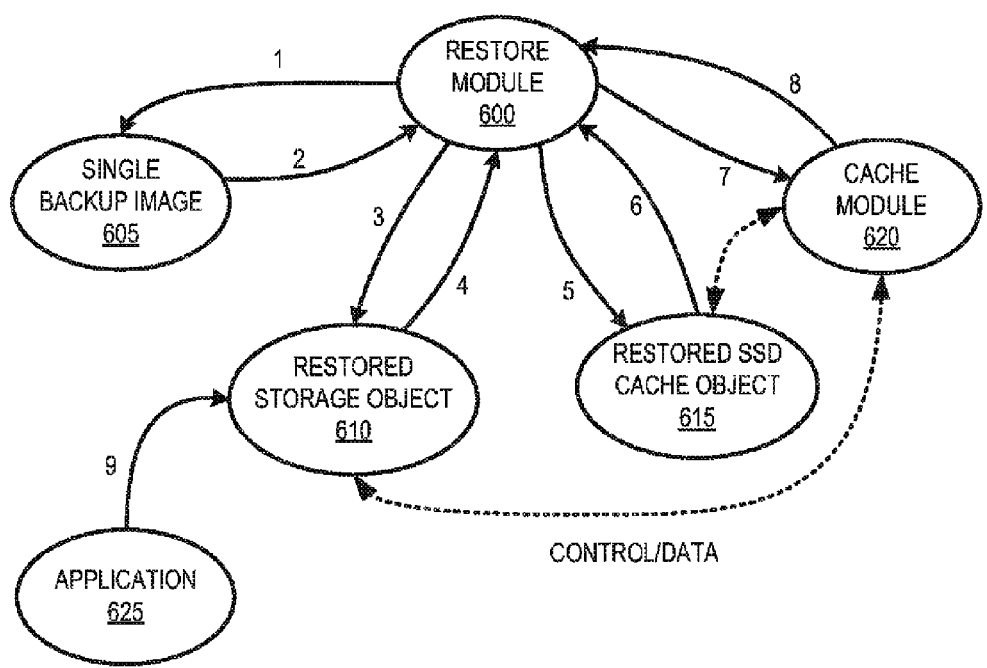
FIG. 6 is a block diagram illustrating an example embodiment of a restore module that may utilize the techniques described herein.

FIG. 6 is a block diagram illustrating an example embodiment of a restore module that may utilize the techniques described herein. The restore module may be used in conjunction with the backup module described above to provide a data recovery solution that advantageously provides cache performance benefit when storage is restored to a point in time backup. The example depicts restoring a cache configured storage object from a single backup image wherein I/O communication proceeds according to the indicated sequence. In this example, the restore module 600 makes use of the single backup image 605 to restore a storage object 610 and an SSD cache object 615 based on a previously generated snaps.

In operation, at step 1, a restore operation is initiated. At step 2, the restore module 600 reads restore data from the single backup image 605. At step 3, the storage object 610 is restored using the storage object portion of the single backup image 605 and at step 4, a storage object restore status is forwarded to the restore module 600. At step 5, the SSD cache object 615 is restored using the SSD cache object portion of the single backup image 605 using a cache mapping technique described below with reference to FIG. 8. At step 6, an SSD cache object restore status is forwarded to the restore module 600. At step 7, cache mapping between restored SSD cache object 615 and restored storage object 610 is enabled. Upon completion, a restore status value is forwarded to the restore module 600, and at step 9, the application is granted access to the restored storage object 610. Control and/or data signals may be communicated between the cache module 620 and the restored storage object 610 as shown via the dotted communication paths. Thus, the restored cache configured storage is exposed to application 625 thereby resulting in an immediate SSD cache I/O performance benefit. By contrast, conventional systems do not have a cache module that communicates with a backup module and restore module in the manner described herein. Consequently, when conventional systems restore a backup, because the cache was not restored, the cache must be rebuilt anew and as a result, suffers performance degradation.

Various embodiments utilizing techniques described herein may employ a cache algorithms such as that described in the following example. The algorithm may configure an SSD cache object of a size X to a storage object of size Y with block size B. Upon successful cache configuration, a superblock having the following format may be maintained in the data storage system 12 memory and stored persistently at SSD Cache Object Sector Z. An example on disk superblock format may include the following:

1. State of superblock.
2. Cache Object Size (X)
3. Storage Object Size (Y)
4. Cache Object label
5. Storage Object label 6. Cache block size (B)
7. Cache DRL The cache dirty region logging (DRL) may be an on disk structure comprising a set of cache block entries where each entry contains cached block information, state information (i.e., dirty or clean), and DRL entry size. Block mapping between an SSD cache object and storage object may be done by using known hash based algorithms so that the storage object block data will be cached in a corresponding SSD cache block. An example cache mapping table of an SSD cache and storage object is shown below.

| Cache Mapping Table Example: | | |
|---|---|---|
| Seq. No. | Storage Object Logical Block Number | SSD Cache Logical Block Number |
| 1 | 10 | 1 |
| 2 | 25 | 2 |
| 3 | 50 | 3 |
| 4 | 51 | 4 |
| 5 | 60 | 5 |

The above table may be build using a linear probing algorithm and hash formula, such as for example, ((Storage Object LBA) % (Total Number of SSD Cache Blocks)+1). A cache search module can be implemented using hashing and/or various dynamic data structures. The cache search module maintains the locality of reference information of the cached data blocks.

Figure 7:
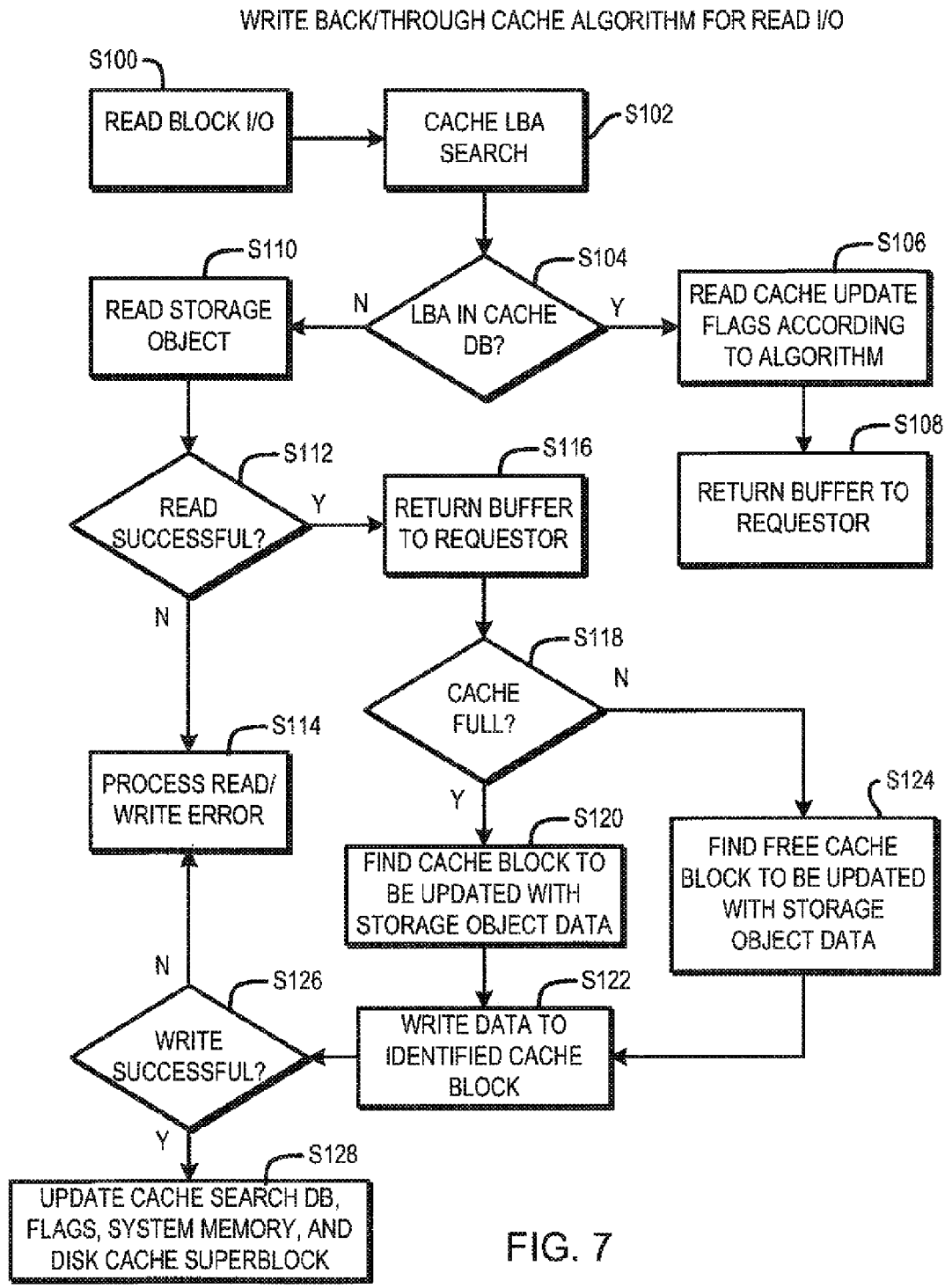
FIG. 7 is a flow diagram illustrating an example embodiment of a cache read algorithm that may utilize the techniques described herein.

FIG. 7 is a flow diagram illustrating an example method of a cache read algorithm that may utilize the techniques described herein. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

The method begins at step S100 by reading I/O for a block. At Step S102, a cache logical block address (LBA) search is executed. If, at step S104, the LBA is found in the cache database, the method proceeds to step S106 where the method reads from cache and then updates flags for the block according to the cache replacement algorithm, and then proceeds to step S108 where a buffer is returned to the requestor. However, if the LBA is not found at step S104, the method proceeds to step S110 and reads the storage object. At step 112, a determination is made as to whether the storage object read was successful or not. If the read was not successful, the method proceeds to step S114, where the read error is processed. If the read was successful, the method proceeds to step S116 where the buffer is returned to the requestor. At step S118, a determination is made to see if the cache is full, and if not, at step S124, the method finds a free cache block to be updated with the storage object. However, if, at step S118, the cache is determined to be full, the method proceeds to step S120 where, based on the cache replenish mechanism, the method locates the cache block to be updated with storage object data. In either case, the method proceeds to step S122 where data is written to the identified cache block. At step S126, a determination is made as to whether the write was successful or not. If the read was successful, the method proceeds to step S128 where various updates are performed including updating the cache search database with the new block, updating flags, and updating system memory and on disk cache superblock with the block information as clean. However, if at step S126 the write was not successful, the method proceeds to step S114 where the write error is processed.

Figure 8:
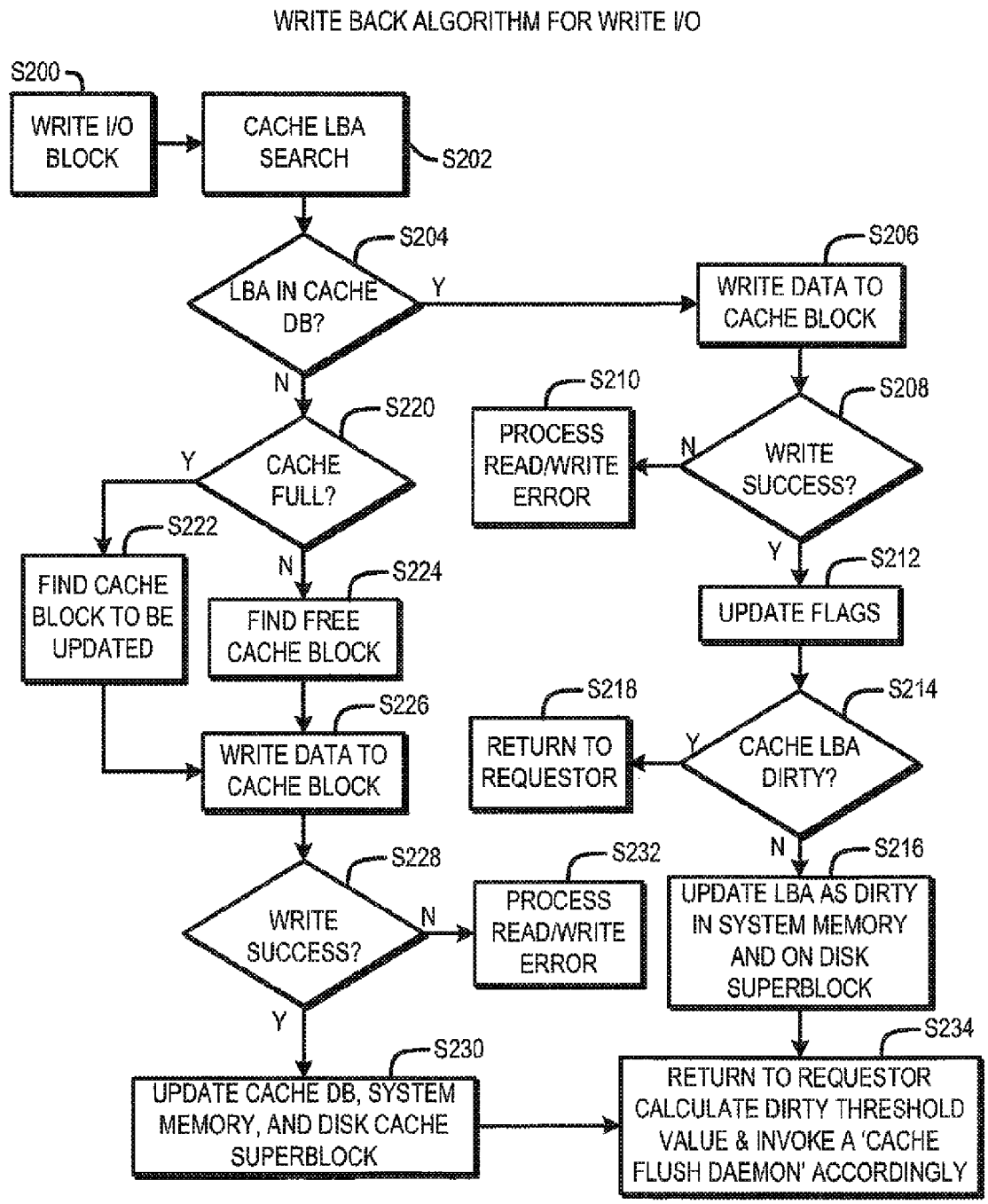
FIG. 8 is a flow diagram illustrating an example embodiment of a cache write algorithm that may utilize the techniques described herein.

FIG. 8 is a flow diagram illustrating an example embodiment of a cache write algorithm that may utilize the techniques described herein. The method begins at step S200 by writing I/O for a block. At Step S202, a cache logical block address (LBA) search is executed. If, at step S204, the LBA is found in the cache database, the method proceeds to step S206 where the method writes data to the cache block, and then proceeds to step S208 where a determination is made to see if the write was successful or not. If the write was not successful, the method proceeds to step S210 where the write error is processed. If the write was successful, the method proceeds to step S212 where flags are updated according to the replenish algorithm. At step S214, a check is made to see if the cache LBA is dirty, and if so, is returned to the requestor. If not, at step S216 the LBA is updated as dirty in system memory and in the on disk superblock data structure and then, at step S234, it returns to the requestor and a dirty threshold value is calculated and a 'cache flush daemon' is invoked accordingly.

However, if the LBA is not found in the cache database at step S204, the method proceeds to step S220 and a determination to see if the cache is full. If the cache is full, based on the cache replenish mechanism, the method locates the cache block to be updated with write I/O data and continues with step S226. If the cache is not full, at step S224, the method locates a free cache block to be updated with write I/O data. At step S226, the data is written to the identified cache block.

At step S228, if the write was not successful, the method proceeds to step S232 where the write error is processed. If the write was successful, the method proceeds to step S230 where various updates are performed including updating the cache search database with the new block, updating flags, and updating system memory and on disk cache superblock with the required information. The method then proceeds to step 234 where it returns to the requestor and a dirty threshold value is calculated and a 'cache flush daemon' is invoked accordingly.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 9:
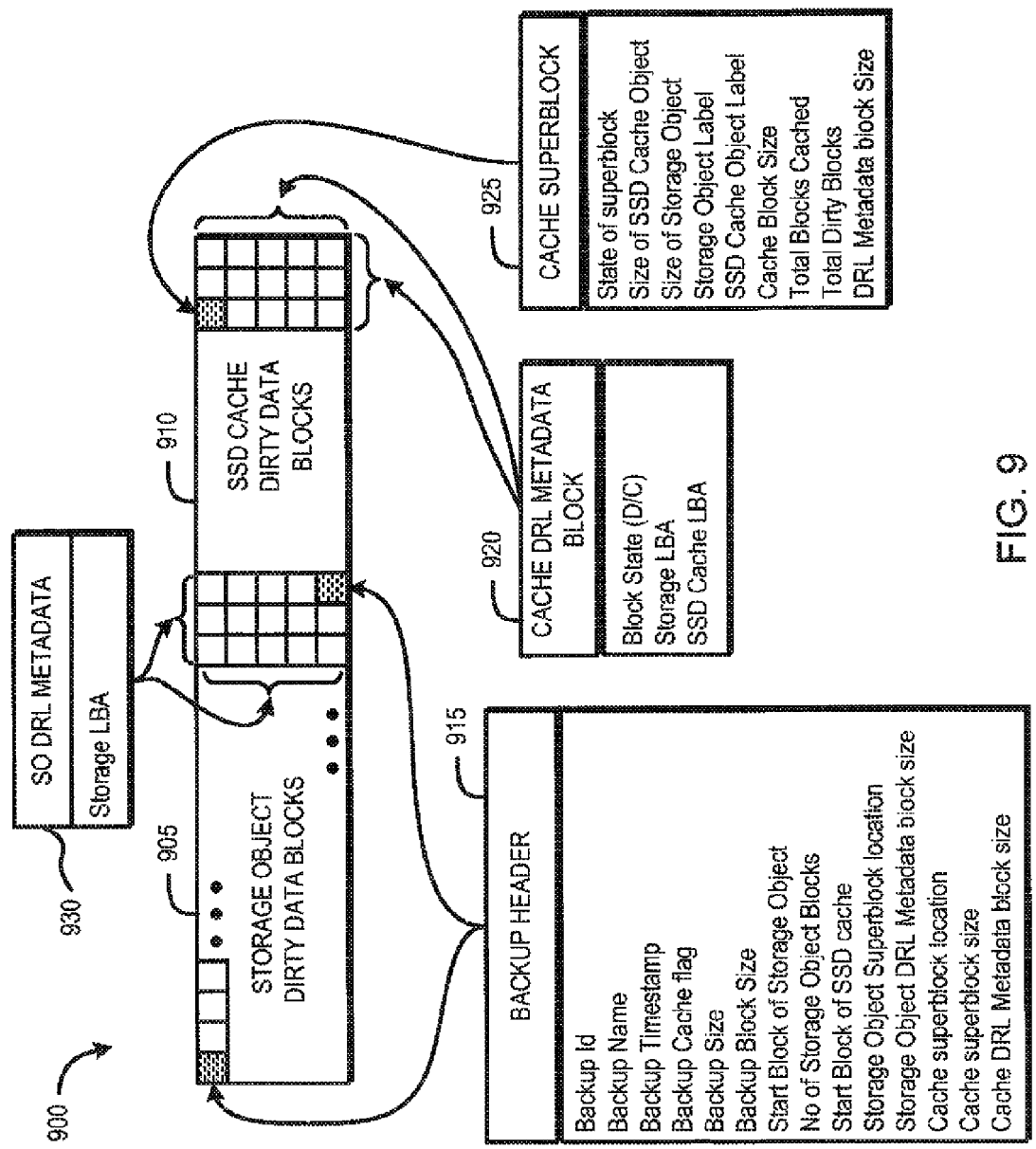
FIG. 9 is a block diagram illustrating an example embodiment of backup image format that may utilize the techniques described herein.

FIG. 9 is a block diagram illustrating an example embodiment of an incremental backup image format that may be utilized in conjunction with the techniques described herein. The backup image 900 includes storage object data blocks 905, SSD cache dirty data blocks 910, backup header 915, DRL metadata blocks 920, cache superblock 925, and storage object (SO) DRL metadata 930. The backup header 915, DRL metadata block 920, and cache superblocks 925 include a number of fields (and are of sufficient size to hold respective fields) as shown in FIG. 9.

In this embodiment, incremental backup is supported through the use of an in memory and on disk bitmap to track all write operations of the storage object at the cache module. The size of the bitmap maintained by the cache module may be as follows:

Bitmap size in bits=(size of storage object in bytes)/(block size of SSD cache object in bytes)
Bitmap size in bytes=(Bitmap size in bits)/8
Bitmap size in sectors=(Bitmap size in bytes)/512

The in memory and on disk (i.e., on cache/dedicated external volume) storage object DRL bitmap of above size is maintained and the same is mutually exclusive of the cache DRL bitmap. That is, bitmaps are maintained for both the disk and the cache.

The DRL bitmap tracks all writes going to the disk as well as the cache and are maintained in the cache module. These bitmaps are used when a backup is performed for the disk and cache. Thus, they are maintained by the cache module because the cache module is aware of all writes going to the disk and cache. Conventionally, only one bitmap (i.e., only metadata of dirty blocks in the superblock of storage object) is maintained as part of a standard backup procedure (i.e., not maintained by the cache module), and as a result, conventional methods cannot avail point in time SSD cache benefit to a restored storage object.

A full backup of a cache configured storage object may be performed using backup techniques such as those described in the related U.S. patent application Ser. No. 13/342,008 entitled "MANAGING CACHE BACKUP AND RESTORE." Consecutive incremental backups may follow the backup method described below.

More detailed examples of backup algorithms, with reference to the general backup algorithm discussed above in FIG. 5 are presented below. In one example embodiment, the algorithm below (referred to herein as "backup method 1") uses the backup image format shown in FIG. 9 and proceeds as follows:

Step 1: send a request to quiesce I/O at cache module
Step 2: take snapshot of storage object
Step 3: take snapshot of SSD cache object
Step 4: if the storage object superblock is maintained on cache go to Step 4, otherwise take a snapshot (SOS1) of the external volume that contains the storage object superblock and DRL information
Step 5: a) Invalidate all dirty buffers in memory and on disk in order to collect the next set of storage object dirty buffers (i.e., new set of writes to storage object after previous full/incremental backup) for the next incremental backup of the storage object
b) unquiesce I/O at Cache module
Step 6: calculate backup image size Backup Image Size=Sizeof(Storage Object dirty buffers)+(2*BackupHeaderSize)+Sizeof(SSD Dirty Blocks)+Sizeof(Superblock, DRL metadata blocks)+Sizeof(storage DRL)

Step 7: create a backup header with the information specified in the backup header 915 shown in FIG. 9
Step 8: determine backup type: if full backup, proceed to step 9 and skip steps 10-14; if incremental backup, skip step 9 and proceed to step 10.
Step 9: perform a full backup of storage object data blocks from the storage object in the backup image starting from 2nd block (i.e., after the backup header start marker)
Step 10: perform an incremental backup of storage object dirty data blocks from the storage object using the storage object DRL bit map to backup image starting from $2^{nd}$ block
Step 11: update the backup header with storage object and SSD cache object metadata information and write two copies of the backup header: one at the first location of the storage object data blocks and another at the end location of the storage object data blocks of the backup image
Step 12: write storage object superblock and DRL metadata for all dirty blocks of the storage object at the end of the storage object dirty data blocks at backup image
Step 13: read SSD cache superblock and DRL metadata information from the SSD cache object and read every SSD cache data block whose DRL state is dirty from the SSD cache object and write these blocks to a backup image location starting after the $2^{nd}$ backup header block
Step 14: write cache superblock and DRL metadata for all dirty/clean blocks of the SSD cache object at the end of the SSD cache dirty data blocks It should be noted that the backup header, cache superblock and DRL metadata blocks need not be written at the locations specified in above algorithm, and the locations that consume less seek time during the backup/restore can be standardized accordingly. The backup format shown in FIG. 9 is but one example embodiment that can be implemented to achieve the functionality described herein.

An alternative example embodiment employing the backup image depicted in FIG. 9 is described below. In this example, the algorithm illustrated may use considerably less storage space than backup method 1. As described above, the backup image 900 of FIG. 9 includes storage object data blocks 905, SSD cache dirty data blocks 910, backup header 915, DRL metadata blocks 920, cache superblock 925, and storage object (SO) DRL metadata 930. The backup header 915, DRL metadata block 920, and cache superblocks 925 include a number of fields (and are of sufficient size to hold respective fields). The space efficient algorithm below (referred to herein as "backup method 2") uses the backup image format shown in FIG. 9:

Step 1: send a request to quiesce I/O at cache module
Step 2: take snapshot of storage object
Step 3: take snapshot of SSD cache object
Step 4: if the storage object superblock is maintained on cache go to Step 4, otherwise take a snapshot (SOS1) of the external volume that contains the storage object superblock and DRL information
Step 5: a) Invalidate all dirty buffers (i.e. new set of writes to storage object after previous full/incremental backup) in memory and on disk in order to collect the next set of storage object dirty buffers for the next incremental backup of the storage object
b) unquiesce I/O at Cache module
Step 6: calculate backup image size Backup Image Size=Sizeof(Storage Object dirty buffers)+(2*BackupHeaderSize)+Sizeof(SSD Dirty Blocks)+Sizeof(Superblock, DRL metadata blocks)+Sizeof(storage DRL)

Step 7: create a backup header with the information specified in the backup header 915 shown in FIG. 9
Step 8: determine backup type: if full backup, proceed to step 9 and skip steps 10-14; if incremental backup, skip step 9 and proceed to step 10.

Step 9: perform a full backup of storage object data blocks from the storage object in the backup image starting from 2nd block (i.e., after the backup header start marker)

Step 10: perform an incremental backup of storage object dirty data blocks from the storage object using the storage object DRL bit map in backup image starting from $2^{nd}$ block Step 11: update the backup header with storage object and SSD cache object metadata information and write two copies of the backup header: one at the first location of the storage object data blocks and another at the end location of the storage object data blocks of the backup image Step 12: write storage object superblock and DRL metadata for all dirty blocks of the storage object at the end of the storage object dirty data blocks Step 13: read SSD cache superblock and DRL metadata information from the SSD cache object and read every SSD cache data block whose DRL state is dirty from the SSD cache object then:
  a) find the matching storage object block that is written on the backup image
  b) if there is a matching storage object block written in the backup image, overwrite that block with dirty SSD cache block otherwise write this block in the backup image location after $2^{nd}$ backup header block Step 14: write cache superblock and DRL metadata for all dirty/clean blocks of SSD cache object at the end of SSD cache dirty data blocks backup image and update backup image cache DRL metadata state for each SSD cache dirty block overwritten on storage object space of the backup image A corresponding example restore algorithm, with reference to the general restore algorithm discussed above in FIG. 6 is presented below. The restore algorithm may utilize the backup image format shown in FIG. 9 and may be used in conjunction with backup method 1 and backup method 2 as described above. The restore algorithm proceeds as follows:

Step 1: read the backup header available at the first block of the backup image

Step 2: identify the latest full backup image and all incremental backup images after the latest full backup up to the recovery point backup version N
  a) restore the full backup image using restore methods described in related U.S. patent application Ser. No. 13/342,008 entitled "MANAGING CACHE BACKUP AND RESTORE") as a result this will create a restored storage object RSO-(N-x)
  b) use RSO-(N-x) as the latest restored storage object and follow below process for each incremental backup image identified up to the recovery point
    (i) read storage object DRL bitmap from backup image and use bitmap information to read all storage object data blocks from the backup image, write the data to latest restored storage object
    (ii) above step creates a latest restored storage object of point in time backup
    (iii) if the point in time backup image version matches the recovery point backup version N then halt this process, otherwise go to step (i)
  c) as a result of Step 2(a) and 2(b), a point in time restored storage object RSO-N will be created Step 3: successful completion of restored storage object (RSO-N) will be followed by an SSD cache object restore operation and the same involves reading the cache superblock and cache DRL bitmap from the point in time backup image N and for every DRL dirty block, read corresponding block available in the backup image and for every clean DRL metadata block, read corresponding block from restored storage object (RSO-N); at the end of this process a consistent SSD cache object (RSCO-N) will be restored Step 4: after successful completion of storage object, and SSD cache restore, create a cache map between the storage object and the SSD cache using cache module Step 5: after successful completion of cache mapping operation, enable application access to the restored storage object (i.e., RSO-N)

The subject matter described herein for managing data backup and recovery in a data storage system may be implemented in hardware, software, firmware, or any combination thereof. As such, the terms "technique" or "logic" as used herein may refer to software in combination with hardware and/or firmware for implementing the feature being described. In one example implementation, the subject matter described herein may be implemented using a non-transitory computer readable medium having stored thereon computer executable instructions that when executed by the processor of a computer perform steps.

Exemplary non-transitory computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing incremental cache backup and restore, the method comprising:
  quiescing input/output (I/O) operations at a cache module;
  taking a first snapshot of a storage object and a second snapshot of a solid state drive (SSD) cache object;
  maintaining, via the cache module, a disk bitmap and a cache bitmap to track dirty buffers associated with the storage object;
  unquiescing I/O operations at the cache module; and
  creating a single backup image comprising the first snapshot and the second snapshot.

2. The method of claim 1, further comprising:
  reading data from the single backup image;
  identifying incremental backups; and
  restoring the storage object and SSD cache object from the single backup image.

3. The method of claim 2, further including mapping restored storage objects and SSD cache object.

4. The method of claim 1, wherein the first and second snapshots are point in time snapshots.

5. The method of claim 1, wherein the storage object includes at least one of a file, block, or logical unit (LU).

6. The method of claim 1, wherein:
  quiescing I/O operations at the cache module includes redirecting uncached write I/O to the storage object; and
  unquiescing I/O operations at the cache module includes disabling redirection of uncached write I/O to the storage object.

7. The method of claim 1, wherein the single backup image includes a backup header, storage object and SSD cache dirty data blocks, storage object DRL metadata, SSD cache DRL metadata blocks, and cache super block.

8. The method of claim 1, wherein a memory area occupied by the single backup image is determined by the equation:

$$\text{backup image size} = \text{sizeof(storage object dirty buffers)} + (2*\text{backupheadersize}) + \text{sizeof(SSD dirty blocks)} + \text{sizeof(superblock, DRL metadata blocks)} + \text{sizeof(storage DRL)}.$$

9. The method of claim 1, further including reserving in-memory and on-disk storage for storing the bitmaps.

10. A system for use in managing incremental cache backup and restore, the system comprising:
a processor;
a memory accessible to the processor and bearing instructions executable by the processor to:
quiesce I/O operations at a cache module;
take a first snapshot of a storage object and a second snapshot of an SSD cache object;
maintain, via the cache module, a disk bitmap and a cache bitmap to track dirty buffers associated with the storage object;
unquiesce I/O operations at the cache module; and
create a single backup image comprising the first snapshot and the second snapshot.

11. The system of claim 10, wherein the instructions are further executable to:
read data from the single backup image;
identify incremental backups; and
restore the storage object and the SSD cache object from the single backup image.

12. The system of claim 11, wherein the instructions are further executable to mapping restored storage objects and SSD cache object.

13. The system of claim 10, wherein the first and second snapshots are point in time snapshots.

14. The system of claim 10, wherein the storage object includes at least one of a file, block, or logical unit (LU).

15. The system of claim 10, wherein:
quiescing I/O operations at the cache module includes redirecting uncached write I/O to the storage object; and
unquiescing I/O operations at the cache module includes disabling redirection of uncached write I/O to the storage object.

16. The system of claim 10, wherein the single backup image includes a backup header, storage object and SSD cache dirty data blocks, storage object DRL metadata, DRL metadata blocks, and cache super block.

17. The system of claim 10, wherein a memory area occupied by the single backup image is determined by the equation:

$$\text{backup image size} = \text{sizeof(storage object dirty buffers)} + (2*\text{backupheadersize}) + \text{sizeof(SSD dirty blocks)} + \text{sizeof(superblock, DRL metadata blocks)} + \text{sizeof(storage DRL)}.$$

18. The system of claim 17, wherein the instructions are further executable to reserve in-memory and on-disk storage for storing the bitmaps.

19. A computer program product for use in managing incremental cache backup and restore comprising:
a non-transitory computer readable medium encoded with computer executable program code, the code configured to enable the execution of:
quiescing input/output (I/O) operations at a cache module;
taking a first snapshot of a storage object and a second snapshot of a solid state drive (SSD) cache object;
maintaining, via the cache module, a disk bitmap and a cache bitmap to track dirty buffers associates with the storage object;
unquiescing I/O operations at the cache module; and
creating a single backup image comprising the first snapshot and the second snapshot.

20. The computer program product of claim 19, the code further configured to enable the execution of:
reading data from the single backup image;
identifying incremental backups; and
restoring the storage object and SSD cache object from the single backup image.

* * * * *